(No Model.)
F. G. MILBRATH.
HITCHING DEVICE.
No. 498,562. Patented May 30, 1893.
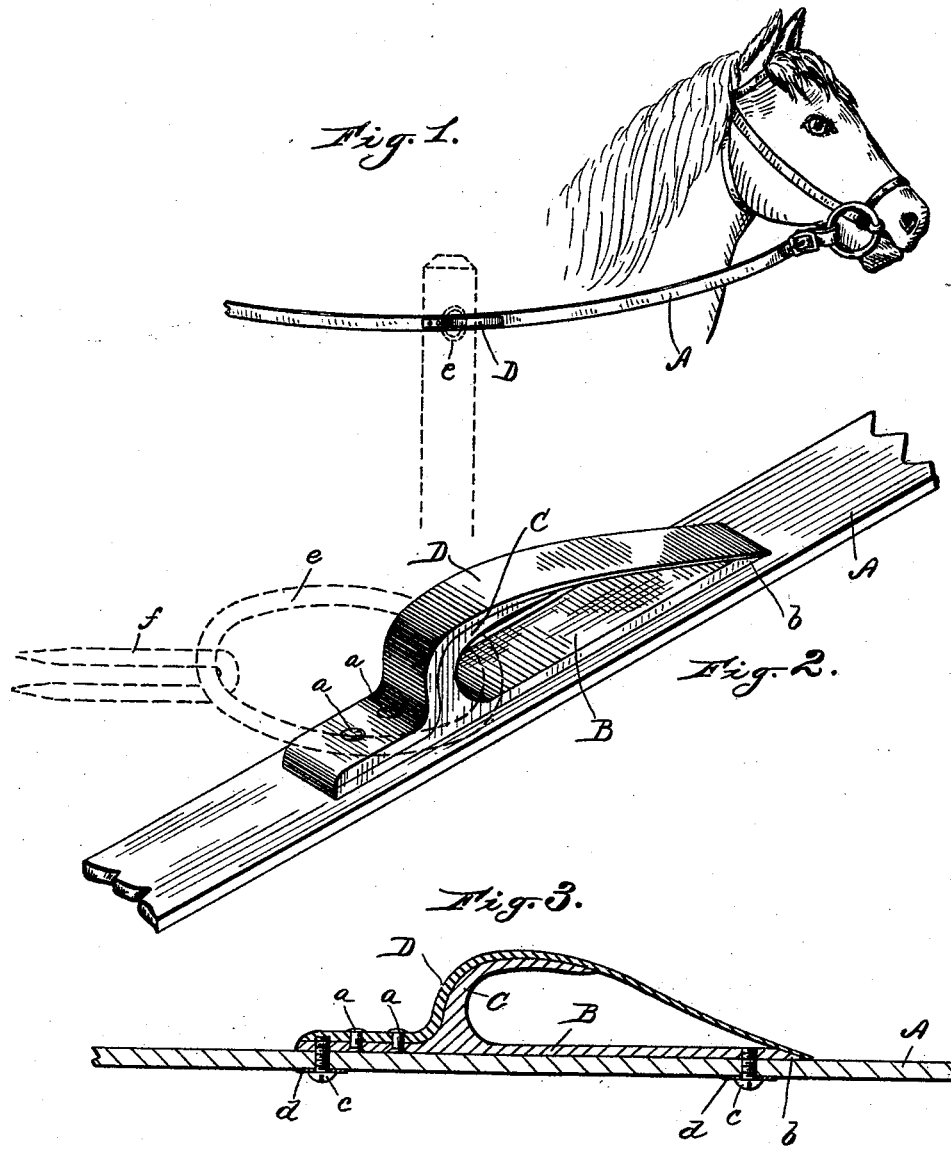
Witnesses,
John E. Wiles.
C. H. Scott.
Inventor,
F. G. Milbrath.
By H. G. Underwood
Attorney.

UNITED STATES PATENT OFFICE.

FERDINAND G. MILBRATH, OF BROWN DEER, WISCONSIN.

HITCHING DEVICE.

SPECIFICATION forming part of Letters Patent No. 498,562, dated May 30, 1893.

Application filed May 23, 1892. Serial No. 434,026. (No model.)

*To all whom it may concern:*

Be it known that I, FERDINAND G. MILBRATH, a citizen of the United States, and a resident of Brown Deer, in the county of Milwaukee, and in the State of Wisconsin, have invented certain new and useful Improvements in Hitching Devices; and I do hereby declare that the following is a full, clear, and exact description thereof.

My invention relates to hitching devices, and consists in certain peculiarities of construction, as will be fully set forth hereinafter, and subsequently claimed.

In the drawings: Figure 1 is a view of my device applied to one of the lines of a harness, in use. Fig. 2 is an enlarged perspective view of said device, and Fig. 3 is a vertical central longitudinal sectional view of the same.

A represents one of the lines or reins of a harness, shown in Fig. 1 as attached in the ordinary manner to a bridle-bit ring.

B is a plate, preferably of malleable iron, having an upward and forwardly curved arm, C, rising from the same, intermediate of its ends.

D is a spring, preferably of steel, shaped, as best shown in Fig. 3, to conform to the rear end and arm C of the plate B, and secured to said rear end of the plate, as by rivets $a\,a$, the said spring resting on the rear end of the plate B, and arm C, and thence extending forward and down to the extreme front end of the plate B, which is preferably beveled at this point, as shown at $b$, so that the front end of the spring may touch the line A, at this point. The plate B is provided with sockets, adjacent to its ends, for attachment to the line, which sockets are preferably screw-threaded to receive the screws $c\,c$, which pass through the line into said sockets, there being, preferably, washers $d\,d$ interposed between said line and the heads of the screws $c\,c$. Thus the device may be quickly and readily applied to either of the reins or lines of any harness, and held securely thereto, at any point desired on said line. Of course, in making a new set of harness, the device may, if preferred, be riveted to the line, but the described screws will hold it firmly and securely to place, and being near the ends of the plate will prevent anything from being caught between said plate and the line.

My described device is adapted to be secured to any ordinary hitching-post ring, such a ring being shown at $e$, in dotted lines on the drawings, which ring may be secured at any other point than a post, if desired, by the use of an ordinary staple $f$, as shown in dotted lines in Fig. 2.

In use the spring D is open sufficiently to admit the ring $e$, when it instantly closes, and the horse is secured. Any movement of the horse to pull away from the post or ring will only serve to bring said ring in close contact with the upright portion of the arm C, while at the same time, a great advantage of my device (especially with a young or restive horse) lies in the fact that the driver may leave the horse fastened until after he is in the vehicle, and then, when he is comfortably seated, and ready to start, he has only to give a slight pull upon the line, to free the device from the hitching ring.

While I have shown the preferred form of my plate, arm, and spring, it is obvious that said form may be varied, as preferred, without departing from the spirit of my invention.

Having thus described my invention, what I claim as new, and desire to secure by Letters Patent, is—

The combination, with a harness line or driving rein, of a base plate secured to said line, or rein, a bent or curved arm rising from said plate, and a spring secured to said plate, and resting on said arm and extending forward and down to the front end of said plate, substantially as set forth.

In testimony that I claim the foregoing I have hereunto set my hand, at Milwaukee, in the county of Milwaukee and State of Wisconsin, in the presence of two witnesses.

FERDINAND G. MILBRATH.

Witnesses:
H. G. UNDERWOOD,
N. E. OLIPHANT.